United States Patent [19]
Stege

[11] Patent Number: 6,044,857
[45] Date of Patent: Apr. 4, 2000

[54] ELECTRONIC CONTROLLER FOR A MODULATING VALVE

[75] Inventor: Daniel K. Stege, Wauwatosa, Wis.

[73] Assignee: Erie Manufacturing Company, Milwaukee, Wis.

[21] Appl. No.: 08/799,709

[22] Filed: Feb. 13, 1997

[51] Int. Cl.[7] .................................................. F16K 31/04
[52] U.S. Cl. ........................ 137/1; 137/154; 251/129.04; 251/129.12
[58] Field of Search .......................... 251/129.04, 129.11, 251/129.12, 129.13; 137/554, 1

[56] References Cited

U.S. PATENT DOCUMENTS

| | | |
|---|---|---|
| 4,364,111 | 12/1982 | Jocz . |
| 4,694,390 | 9/1987 | Lee . |
| 4,791,954 | 12/1988 | Hasegawa . |
| 4,816,987 | 3/1989 | Brooks et al. . |
| 4,823,552 | 4/1989 | Ezell et al. . |
| 4,902,945 | 2/1990 | Meades, Jr. et al. . |
| 4,911,192 | 3/1990 | Hartfiel et al. . |
| 4,980,825 | 12/1990 | Tootell et al. . |
| 4,990,840 | 2/1991 | Migda . |
| 5,033,012 | 7/1991 | Wohld . |
| 5,056,046 | 10/1991 | Mutchler et al. . |
| 5,076,321 | 12/1991 | Terry . |
| 5,099,867 | 3/1992 | Emery ............................. 251/129.11 X |
| 5,147,559 | 9/1992 | Brophey et al. . |
| 5,156,373 | 10/1992 | Boyles et al. .................. 251/129.04 X |
| 5,251,665 | 10/1993 | Schaufield . |
| 5,307,288 | 4/1994 | Haines . |
| 5,329,465 | 7/1994 | Arcella et al. . |
| 5,381,996 | 1/1995 | Arnemann et al. ................. 137/554 X |
| 5,704,392 | 1/1998 | Frew ............................... 251/129.12 X |
| 5,831,406 | 11/1998 | Bleibinhaus et al. .......... 251/129.12 X |

FOREIGN PATENT DOCUMENTS

| | | |
|---|---|---|
| 0306159 | 3/1989 | European Pat. Off. . |
| 2461867 | 2/1981 | France . |
| 3726885 | 2/1989 | Germany . |
| 196 52 583 | 11/1997 | Germany . |
| WO 98/13633 | 2/1988 | WIPO . |

*Primary Examiner*—Kevin Lee
*Attorney, Agent, or Firm*—Terrence Martin; Sean Detweiler; Jules Jay Morris

[57] ABSTRACT

A valve control circuit is disclosed for operating a modulating valve which can be operated between a completely open and a completely closed position. The modulating valve control circuit includes a microcontroller which receives an input signal from an external temperature controller. The microcontroller monitors and controls the position of the modulating valve by first determining the number of rotations of the bi-directional driving motor required to move the valve from a completely open to a completely closed position. After determining the number of rotations for a complete valve stroke, the microcontroller positions the valve stem in the correct position according to the input setpoint as compared to an input range. The microcontroller positions the valve stem in direct relation to the proportion of the input setpoint signal with respect to the range desired. The modulating valve control circuit also includes a solenoid control circuit which can be operated to engage and disengage a solenoid clutch, such that the valve can include a return spring.

35 Claims, 3 Drawing Sheets

U.S. Patent  Apr. 4, 2000  Sheet 1 of 3  6,044,857
FIG. 1
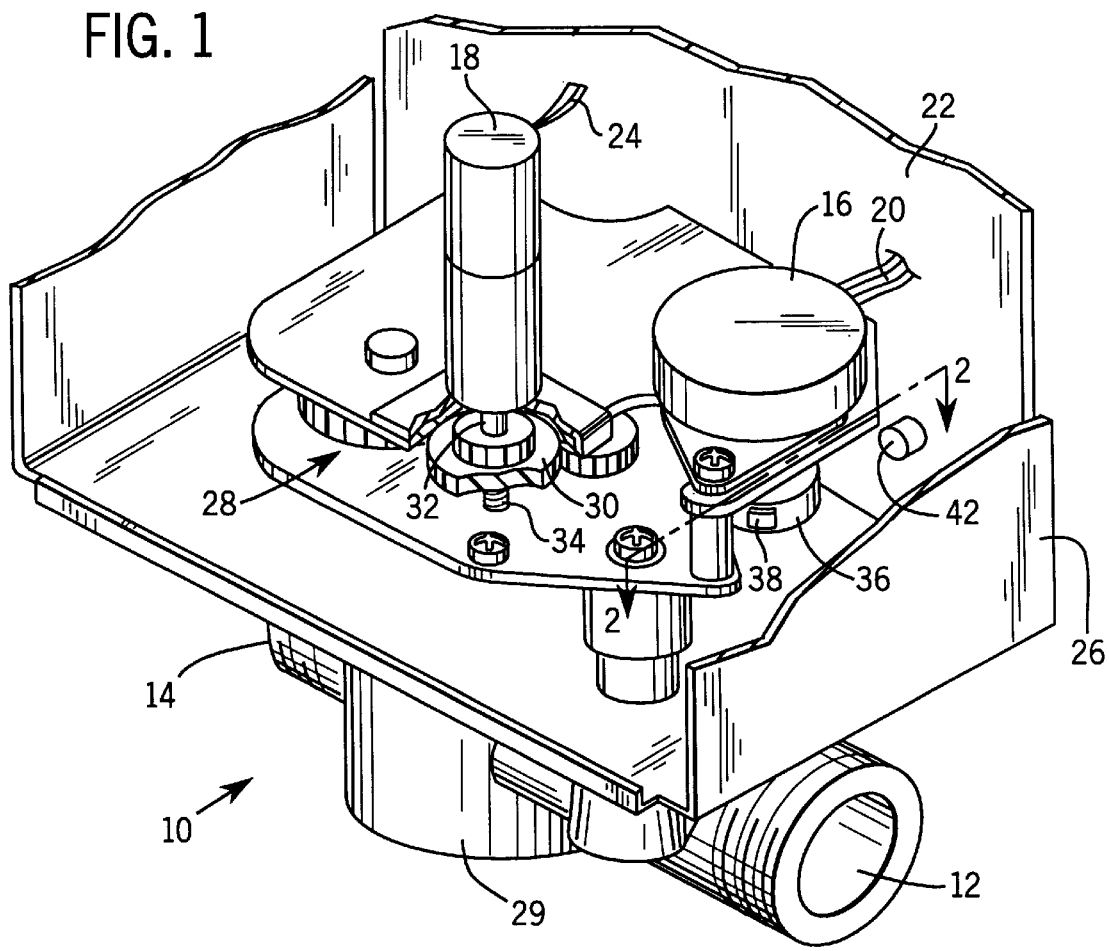
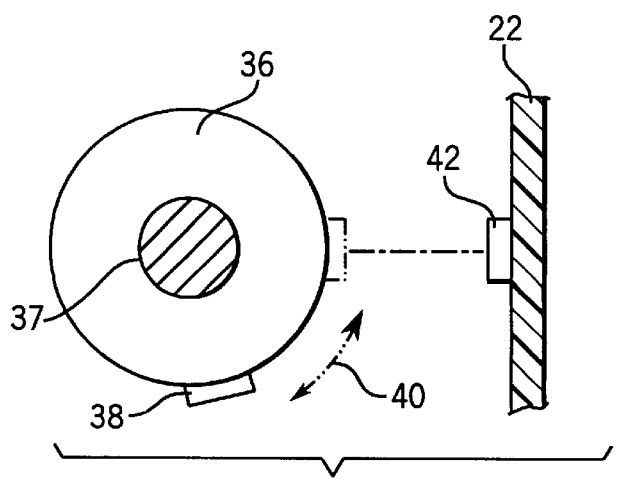
FIG. 2

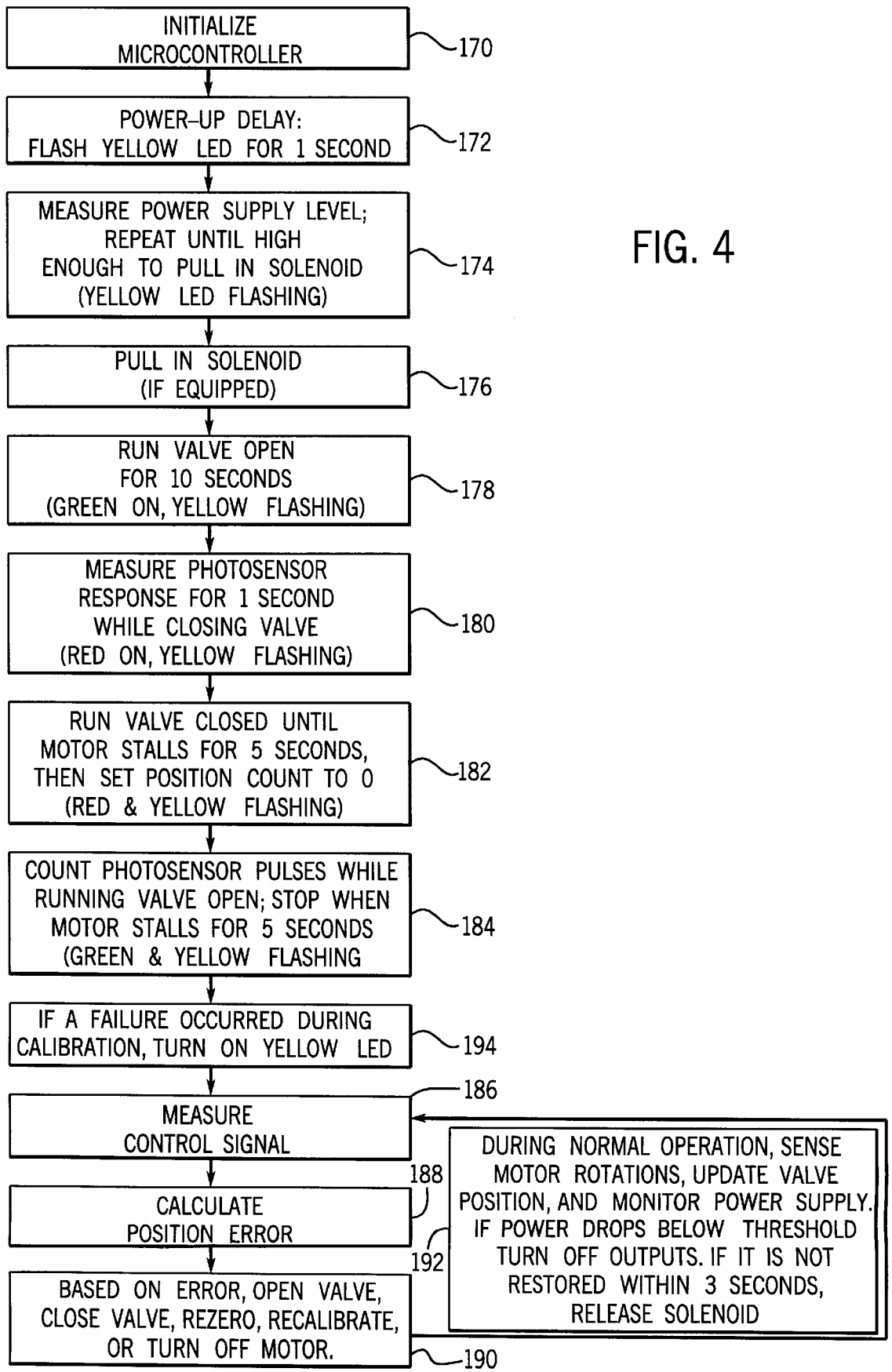

ELECTRONIC CONTROLLER FOR A MODULATING VALVE

BACKGROUND OF THE INVENTION

The invention relates to a modulating valve for controlling the flow of a heating or cooling liquid. More particularly, the invention is a microprocessor driven controller for controlling the position of a valve plug member in a modulating valve.

In many present heating and cooling systems, a pneumatically controlled modulating valve is used to regulate the flow of the heating or cooling liquid throughout the system. These modulating valves are controlled by a source of varying air pressure supplied to a diaphragm in the modulating valve to control the position of the valve plug member within the valve body. By changing the amount of air pressure applied to the modulating valve, the position of the valve plug can be controlled, thus regulating the flow of heating or cooling liquid through the system. Although this method of controlling the flow of liquid through a valve has been effective for many years, it requires a source of pneumatic pressure to be piped throughout a building in order to provide control for the various modulating valves.

In many new building constructions and in the retrofitting of old buildings, it is desired to provide a main electronic controller which controls the environment of the enclosed space. When modifying an existing building that has pneumatically controlled modulating valves, it is desirable to replace the pneumatic valve with an electronically controlled modulating valve such that the valve can be controlled by the main controller.

Currently, many electronically controlled modulating valves include a potentiometer connected to the valve stem, such that the movement of the valve stem between the open and closed position rotates the potentiometer, thereby varying the resistance. The potentiometer is coupled to a control circuit, such that the position of the valve stem can be monitored by measuring the changing resistance. The described modulating valve has several drawbacks. For instance, the potentiometer included in the valve must be a very accurate device and must be factory pre-set, since the range of resistance of the potentiometer between the completely open and completely closed valve position must be precisely known. Presetting the potentiometer adds to both the cost and production time of a modulating valve. In addition to the cost constraints, the mechanical feedback provided by the rotating potentiometer suffers from the limited life of the potentiometer and reliability problems resulting from normal wear during continuous usage.

Many modulating valves include a clutch assembly and return spring which allows the valve to return to a specific state, either completely open or completely closed, upon power or pressure loss to the valve. In electronically controlled valves, the clutch assembly is operated by an electric solenoid which must be activated to engage a series of gears, thereby allowing an electric motor in the valve to move the valve plug member. Upon power loss, it is desirable that the solenoid disengage the gear assembly, thereby allowing the return spring to either completely open or completely close the valve depending upon the system requirements. Typically, to operate the solenoid clutch, additional circuitry must be included in the valve controller, such that the solenoid can be deactivated upon power loss. This additional circuitry increases the cost and design complexity of the modulating valve.

It is therefore an object of the invention to provide a microcontroller based electronic controller to accurately operate a modulating valve. It is another object of the invention to provide an electronic controller which monitors the position of the valve stem without the use of a factory pre-set potentiometer. It is another feature of the invention to provide an electronic controller which can calibrate itself to determine the valve stroke from a completely open to a completely closed position and position the valve stem accurately based on an input signal. It is another feature of the invention to provide an electronic controller which is able to select from a variety of input ranges, such that the modulating valve may be used with a variety of external temperature controllers.

SUMMARY OF THE INVENTION

The present invention overcomes the aforementioned problems and provides a method and a control circuit for controlling the position of the valve plug member in a modulating valve.

The invention provides a microprocessor based control circuit which monitors and controls the position of the valve plug member within a modular valve body based on a setpoint signal received from an external temperature controller. The apparatus of the invention accurately monitors the position of the valve plug member, such that the valve can be opened, closed or adjusted dependent upon the setpoint signal received from the external temperature controller.

The valve control circuit of the invention consists of a power supply section which converts the line voltage into a variety of usable voltage values for the remaining components of the valve control circuit. The valve control circuit includes a microcontroller which is used to operate the remaining components of the control circuit. The microcontroller is configured such that an input range selection signal can be selectively applied by the user to select the type of input that will be received by the microcontroller, so that the microcontroller is able to receive a setpoint input signal which is either voltage or current based. Upon receiving the input range selection signal, the microcontroller receives a setpoint signal from an external temperature controller, which can be either a voltage or a current. The microcontroller determines the position of the setpoint signal within the selected input range to calculate a setpoint value based on the proportion of the setpoint with regard to the selected input range.

The modulating valve of the invention includes a photosensor positioned to monitor the number of revolutions of the motor clutch of a bi-directional driving motor. The motor clutch includes a reflective section, such that as the bi-directional motor is operated, the photosensor is able to accurately count the number of revolutions of the motor clutch.

During initial set-up, the microcontroller self-calibrates itself by operating the valve between a completely closed and a completely open position. Through the photosensor, the microcontroller counts the number of motor revolutions needed to go between the completely closed and completely open positions. After the self-calibration is complete, the number of revolutions required for the complete valve stroke is stored in the microcontroller.

After receiving the setpoint signal, the microcontroller compares the current position of the valve plug member with the setpoint signal and operates the bi-directional motor in the required direction. As the motor moves the valve plug member, the photosensor counts the number of revolutions of the motor until the valve plug member assumes the proper position based on the proportion of the input setpoint signal with relation to the selected input range.

In another feature of the invention, the valve control circuit includes a solenoid control circuit to operate a solenoid clutch. After a brief delay following initial power supply to the valve, the microcontroller enables and activates the solenoid to engage the solenoid clutch, such that the motor is able to position the valve plug member. Upon power loss to the valve, the microcontroller releases the solenoid after a time delay to disengage the solenoid clutch, thereby allowing a return spring to return the valve plug to either a completely open or a completely closed position.

Various other features, objects, and advantages of the invention will be made apparent from the following detailed description and the drawings.

BRIEF DESCRIPTION OF THE SEVERAL VIEW OF THE DRAWINGS

The drawings illustrate the best mode presently contemplated for carrying out the invention. In the drawings:

FIG. 1 is a perspective view of a modulating valve having a solenoid clutch assembly incorporating the valve control circuit of the present invention;

FIG. 2 is a sectional view taken along line 2—2 in FIG. 1 showing the optical sensor of the modulating valve of FIG. 1;

Figure 3:
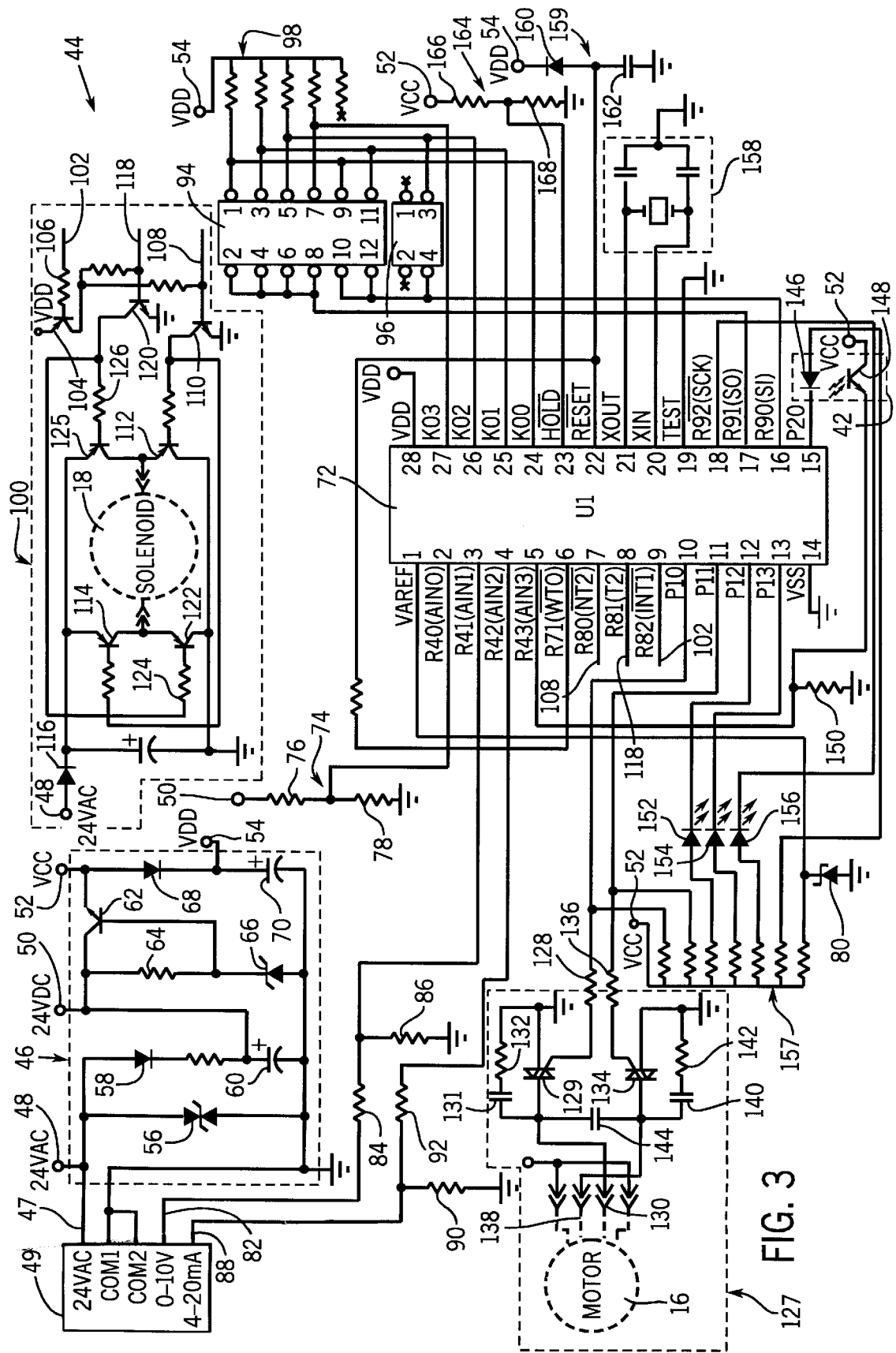

FIG. 3. is a detailed circuit diagram of the preferred embodiment of the valve control circuit incorporated into the modulating valve of FIG. 1; and FIG. 4 is a flow chart detailing the basic operating steps performed by the valve control circuit of FIG. 3.

DETAILED DESCRIPTION OF THE INVENTION

FIG. 1 shows a modulating valve 10 having an inlet passage 12 and a discharge passage 14. Modulating valve 10 has an internal plug member (not shown) for controlling fluid flow therethrough. An example of such a valve and plug member is disclosed in U.S. patent application Ser. No. 07/922,637, now issued as U.S. Pat. No. 5,397,098, incorporated herein by reference.

Fluid flow through the modulating valve 10 is controlled by a bi-directional motor 16 which moves the plug member of valve 10 between its various positions, in a manner as is known. In the preferred embodiment of the invention, motor 16 is disengageable from the plug member of modulating valve 10 by a clutch assembly including a solenoid 18, the operation of which will be described in detail below. Bi-directional motor 16 has motor leads 20 which are connected to a valve control circuit contained on a circuit board 22, the operation of which will be described in greater detail with reference to FIG. 3. The valve control circuit is connected to an external temperature controller for controlling fluid flow through the valve.

In the preferred embodiment of the invention, the solenoid 18 is a magnetically held solenoid, such as for example Model No. TDS-K06B-22, sold by Takahashi Electric Company, and has circuit leads 24 connected to a solenoid control circuit contained on circuit board 22, the operation of which will be described in greater detail with reference to FIG. 3. The magnetic solenoid 18 contains a permanent magnet which holds the solenoid in either an activated or a deactivated position, as is known. To move the magnetic solenoid 18 to an activated position, a forward source of electricity is applied to the solenoid 18. Once the electricity has been supplied, the permanent magnet in the solenoid 18 holds the solenoid 18 in an activated state indefinitely without further supply of electric power. To release the solenoid 18 from its activated state, a reverse supply of electric power must be applied to the solenoid 18. The solenoid control circuit is also mounted upon the circuit board 22 which is securely held within the valve controller housing 26 of valve 10 in a manner as is known.

Bi-directional motor 16 provides output power through an output shaft to a drive gear (not shown) to drive the drive gear in either a valve open direction or a valve closed direction. Through the drive gear, the bi-directional motor 16 drives a gear train 28. Gear train 28 engages an actuator shaft (not shown) which extends downwardly into the body of valve 10, shown at 29, to move the valve plug member in the valve 10 in either the valve open direction or the valve closed direction depending upon the system requirements. The gear train 28 is disengageably connected to the motor 16 by a dropout gear assembly 30 mounted to an extendable and retractable plunger 32 of solenoid 18. While the solenoid 18 is in an activated state, the dropout gear assembly 30 is engaged with gear train 28 to allow the bi-directional motor 16 to move the valve stem through the gear train 28. While the solenoid 18 is deactivated, the dropout gear assembly 30 is disengaged from the gear train 28 such that the bi-directional motor 16 is unable to move the valve stem.

When power is lost or cut off to valve 10, either during normal power downs or during abnormal outages, it is desirable that the modulating valve 10 assume a predetermined position — either completely opened or completely closed. In accordance with conventional technology, valve 10 incudes a return spring for biasing its plug member toward either the closed or open position, depending upon the particular valve construction. In this manner, the plug member of valve 10 automatically assumes the position toward which it is biased when the plunger 32 of solenoid 18 is extended to disengage drop-out gear assembly 30 from the gear train 28.

Initially, when electric power is disrupted to the valve 10 and solenoid 18, the magnetic properties of the solenoid 18 act to hold the plunger 32 in a pull-in position. In the pull-in position, the dropout gear assembly 30 is forced by a spring 34 into engagement with the gear train 28. Because of the frictional resistance of the gear train 28 and the bi-directional motor 16, the internal plug member is held in the position it was in before power outage. To release the plunger 32 and to enable the valve plug member to move to its open or closed position under the influence of the internal return spring, a set amount of power must be pulsed to the magnetic solenoid 18 in a reverse direction, which in turn releases the plunger 32 and allows a plunger spring (not shown) associated with solenoid 18 to overcome the dropout gear assembly spring 34. The plunger spring thereby forces the dropout gear assembly 30 in a downward direction against the force of spring 34, disengaging the gear train 28, thus disengaging bi-directional motor 16. Once the dropout gear assembly 30 is disengaged, the return spring (not shown) moves the valve plug member to a completely open or a completely closed position, depending upon the configuration of the modulating valve 10.

Although the valve shown in FIG. 1 has been described as including a magnetic solenoid 18 and a return spring, the following description of the control circuit is equally applicable to a valve having an electromagnetic solenoid or to a valve without any type of solenoid and hence no return spring.

In accordance with the present invention, the position of the valve plug member in the modulating valve 10 is monitored by measuring the number of rotations of the output shaft of bi-directional motor 16, as indicated by the number of rotations of a motor clutch 36. As can best be understood in FIG. 2, the motor clutch 36 is mounted to the motor output shaft, shown at 37. The motor clutch 36 includes a series of teeth (not shown) that engage the drive gear to permit the motor 16 to drive the gear train 28 and move the valve plug. The motor clutch 36 magnetically engages the motor output shaft 37, such that when the valve plug reaches its mechanical stops at either the completely open or completely closed position, the increased torque between the motor output shaft 37 and the motor clutch 36 causes the clutch to slip, preventing the motor 16 from stripping the teeth of the gears in the gear train 28. Thus, when the motor clutch 36 is rotating, the motor 16 is moving the valve plug in either the valve open or valve closed direction.

The motor clutch 36 includes a reflective section 38 along its outer circumference. Reflective section 38 is preferably a portion of adhesive backed reflective tape having a length substantially less than the length of the outer circumference of the motor clutch 36, although other methods of creating a reflective section are contemplated by the inventor. In the preferred embodiment of the invention, the length of the reflective section 38 is approximately one-half the length of the outer circumference of the motor clutch 36. The motor clutch 36 is constructed of a relatively non-reflective material compared to the reflective section 38, such that as the motor clutch 36 rotates as indicated by arrow 40, a fixed-position photosensor 42 detects the passage of the reflective section past the photosensor 42. The photosensor 42 is mounted to circuit board 22 and is connected to a valve control circuit 44 incorporated into circuit board 22 and which is shown in detail in FIG. 3. By monitoring the number of rotations of the motor clutch 36 of bi-directional motor 16, the position of the valve plug member within the modulating valve 10 can be determined, as will be discussed in greater detail below.

FIG. 3 shows the valve control circuit 44 mounted to the circuit board 22 that provides the necessary control for the modulating valve 10.

The valve control circuit 44 includes a power supply section generally designated by reference numeral 46. The power supply section 46 is connected to an external source of power, such as the 24 volts AC available at pin 47 of a terminal block 49 in the preferred embodiment. Terminal block 49 is mounted to circuit board 22 and provides a convenient point of connection between the valve control circuit 44 and external components, such as a power supply and a temperature controller. The power supply section 46 includes a plurality of output terminals including a line output 48, a line DC output 50, an intermediate DC output 52 (VCC) and a low DC output 54 (VDD). In the preferred embodiment of the invention, VCC is approximately 6.1 volts while VDD is approximately 5.4 volts. The power supply section 46 includes a transient suppressor (varistor) 56, diode 58 and capacitor 60 which combine to rectify the AC line voltage 48 to generate a constant line DC output 50. This constant line DC output 50 is scaled down and regulated by transistor 62, resistor 64 and zener diode 66 to generate the intermediate DC voltage output 52 (VCC). This intermediate DC voltage output 52 (VCC) is reduced by the voltage drop across diode 68 to generate the low DC voltage output 54 (VDD). Capacitor 70 is connected between the low DC voltage output 54 and ground to stabilize the output 54. The power supply section 46 thus provides four separate voltage values which can be used throughout the remaining portion of the valve control circuit 44.

The valve control circuit 44 of the invention is centered around a programmable microcontroller 72. In the preferred embodiment of the invention, the microcontroller 72 is Model No. TMP47P241VN, sold by Toshiba. Microcontroller 72 contains 28 pins, numbered 1–28 in FIG. 3, and can be programmed to perform a variety of functions. In the preferred embodiment of the invention, the microcontroller 72 is programmed by using conventional C-programming language to perform the desired functions which will be described in detail below.

Connected to pin 2 of the microcontroller 72 is a voltage divider 74 consisting of resistor 76 and resistor 78. Resistor 76 is connected to voltage output 50 such that the voltage output 50 is divided between the two resistors 76 and 78. The voltage across resistor 78 is directly related to the line voltage 50, and hence line output 48, and is input into pin 2 of the microcontroller 72. The microcontroller 72 compares the voltage value at pin 2 to a reference voltage supplied at pin 1. The reference voltage at pin 1 is regulated by the a zener diode 80. Preferably, zener diode 80 is a precision zener diode and provides a 5 volt reference signal with a tolerance of ±0.1 volt to pin 1 of microcontroller 72. Microcontroller 72 compares the voltage at pin 2, which represents the voltage characteristic of power supply 46, with the reference voltage at pin 1. If the voltage at pin 2 is too low, such as for example during a brownout, the microcontroller 72 will not operate the valve 10. The values of resistors 76 and 78 are selected to scale down the line voltage 50 to a value microcontroller 72 can measure. The sensitivity of the valve control circuit 44 to low power supply can be modified by adjusting the software in the microcontroller 72. In the preferred embodiment of the invention, the microcontroller 72 will not begin to operate until the voltage at the line output 48 reaches 20 volts AC.

Pins 3 and 4 of microcontroller 72 are configured to receive one of two possible setpoint signals from an external temperature controller (not shown), through the terminal block 49. The pair of setpoint signal inputs to microcontroller 72 (pins 3 and 4) increase the flexibility of the microcontroller 72 by permitting either one of two distinct types of temperature controllers to be connected without modification to the valve control circuit 44. The first setpoint signal is a 0 to 10 volt input signal from a voltage-based temperature controller, as shown at terminal 82. The 0 to 10 volt setpoint signal present at terminal 82 is received from the external temperature controller and represents the amount the valve 10 needs to be opened based on system requirements. For instance, a value of 0 volts at 82 may indicate that the valve 10 should be completely closed, while a maximum value of 10 volts indicates that the valve 10 should be completely open. Likewise, a 2.5 volt signal at 82 indicates the valve should be 25% open. The voltage at output terminal 82 of terminal block 49 is scaled down by a pair of resistors 84 and 86, such that the voltage at terminal 82 is of a value that can be compared to the reference voltage at pin 1. In the preferred embodiment of the invention, the resistors 84 and 86 are matched resistors such that the voltage value at terminal 82 is halved before it is connected to pin 3.

A second setpoint input signal represented at terminal 88 of terminal block 49 is a 4 to 20 mA setpoint signal from a second type of external temperature controller (not shown) which is current-based. In much the same manner as previously discussed, a 4 mA setpoint signal at terminal 88 may indicate the valve 10 should be completely closed, while the 20 mA setpoint signal indicates the valve should be completely open. Current values at terminal 88 between the maximum and minimum indicate a valve position proportional to the current value at terminal 88. The current value at terminal 88 is converted to a voltage by a pair of resistors 90 and 92, such that the voltage reaching pin 4 is less than the reference voltage.

The valve control circuit 44 is furnished with a jumper 94 to allow the user to select different operating ranges of the valve 10. For example, by selectively connecting pin 17 of microcontroller 72 to any one of the pins 2, 4, 6 or 8 of jumper 94, the user can select an input range to the microcontroller. In the preferred embodiment, pin 2 represents a 0–10 volt range, pin 4 represents a 0 to 5 volt range, pin 6 represents a 5 to 10 volt range, and pin 8 represents a 4 to 20 mA range. Therefore, the valve control circuit 44 can operate with a variety of external input devices connected to either terminal 82 or 88 of terminal block 49.

The valve control circuit 44 is furnished with a second jumper 96 to allow the valve action to be reversed. For example, if the direct acting pin (pin 2 of jumper 96) is connected to pin 16 of microcontroller 72, the valve 10 opens upon receiving an increasing setpoint signal at 82 or 88. To reverse the valve action such that the valve closes upon receiving an increasing setpoint signal, pin 4 of jumper 96 is connected to pin 16 of microcontroller 72. The jumpers 94 and 96 are coupled in a known manner to a series of resistors 98 connected between low DC output 54 (VDD) and the pins of each jumper 94,96. Additionally, jumper 94 has a valve open connection, pin 10, and a valve close connection, pin 12, such that the user can override the valve control circuit 44 to selectively open or close the valve 10.

A solenoid control circuit 100 is shown which operates the magnetic solenoid 18 to perform the functions previously discussed. A solenoid enable line 102 is connected to pin 9 of microcontroller 72. When power is initially applied to the modulating valve 10 and after an initial time delay, the microcontroller 72 sends a signal out on pin 9 to the solenoid enable line 102, which is applied to the base of a transistor 104 through a resistor 106 to turn on transistor 104. To activate the solenoid 18 and engage the drive train 28 and the bi-directional motor 16, the microcontroller 72 supplies a high voltage at pin 7, which in turn is connected to a solenoid pull-in line 108. This high voltage value at line 108 turns on a transistor 110 which, in turn, turns on a pair of transistors 112,114. In this manner, the supply voltage 48 is allowed to flow through a diode 116, through transistor 114, through solenoid 18 and finally through transistor 112, which results in activation of the solenoid 18 to retract plunger 32.

A solenoid release line 118 is connected to pin 8 of microcontroller 72 such that when the solenoid is to be released, the microcontroller 72 sends out a signal on pin 8 which, in turn, is applied to solenoid release line 118. This high signal on line 118 turns on a transistor 120, which in turn turns on a transistor 122 through a resistor 124. Additionally, a transistor 125 is turned on through a resistor 126, which allows power to flow through the solenoid 18 in the reverse direction, thereby releasing the magnetically held solenoid 18. The configuration of transistors 112,114, 124 and 126 shown in solenoid control circuit 100 is commonly referred to as an H-bridge configuration and is well known. However, in previous solenoid control circuits without the microcontroller 72, the timing for the solenoid control circuit 100 had to be supplied by a complex analog circuit.

Bi-directional motor 16 is connected to pins 10 and 11 of the microcontroller 72 through a conventional motor control circuit 127. Pin 10 of the microcontroller 72 is connected through a resistor 128 to a triac 129. When pin 10 is allowed to go high by the microcontroller 72, the high signal turns on triac 129 which, in turn, applies a signal through a motor lead 130 to operate the bi-directional motor 16 in a forward direction. To stop motor operation, the microcontroller 72 sinks the high signal at pin 10 to ground. A capacitor 131 and a resistor 132 are connected across triac 129. Therefore, by selectively allowing pin 10 to go high, microcontroller 72 can operate the motor 16 in a forward direction. To operate the bi-directional motor 16 in the reverse direction, microcontroller 72 selectively allows pin 11 to go high which turns on a triac 134 through a resistor 136. When the triac 134 is turned on, a signal is applied through a motor lead 138 to operate motor 16 in a reverse direction. As previously discussed, a capacitor 140 and a resistor 142 are connected across triac 134. Additionally, a capacitor 144 is connected between the two triacs 128 and 134.

The photosensor 42 is shown connected to pins 5 and 15 of microcontroller 72. The photosensor 42 is a single component consisting of a light emitting diode 146 and a photoreceptor 148. As can be understood with reference to FIG. 1, as the light emitting diode 146 emits light, the light is reflected from the reflective strip 38 on the motor clutch 36 each time reflective strip 38 passes light emitting diode 146 upon rotation of motor output shaft 37, and the reflected light is received by the photoreceptor 148. The photoreceptor 148 is connected between the intermediate power source 52 (VCC) and pin 5 of microcontroller 72. A pull-down resistor 150 connects the emitter of the photoreceptor 148 to ground to determine the voltage applied to pin 5 of microcontroller 72. In this manner, as the reflective portion 38 of the motor clutch 36 passes in front of the photosensor 42, a pulse signal is sent to pin 5 of microcontroller 72. Microcontroller 72 thus can count the number of pulses at pin 5, which relates to the number of rotations of the motor clutch 36. The significance of this function will be discussed in greater detail below.

A series of indicator LED's 152,154 and 156, are connected to intermediate power supply 52 (VCC) through a resistor bank 157. Preferably, LED 152 is a red LED and is connected to pin 12 of microcontroller 72 and is activated to indicate that the motor 16 is operating to close the valve 10. LED 154 is preferably a green LED and is connected to pin 13 of microcontroller 72 and is activated to indicate that the motor 16 is operating to open the valve 10. LED 156 is preferably a yellow LED and is connected to pin 18 of the microcontroller 72 and is activated to indicate the calibration status of microcontroller 72. The microcontroller 72 is also able to operate the LED's 152, 154 and 156 in a variety of combinations to indicate particular functions of the microcontroller which will be described in detail below.

Shown at 158 is a conventional clock signal generator 158 which is connected between pins 20 and 21 of the microcontroller 72. Clock signal generator 158 provides the required timing for the particular functions performed by the microcontroller 72.

The operation of the microcontroller 72 and the valve control circuit 44 will now be discussed in detail, with reference being made to FIG. 3 and the microcontroller operating flow chart of FIG. 4. Upon initial power supply to the system, a conventional reset circuit 159 consisting of a diode 160 and a capacitor 162 applies a voltage signal to the reset pin 22 on microcontroller 72 after an initial time delay created by the capacitor 162. The initial low voltage upon power-up at the reset pin 22 holds the reset pin low which causes the microcontroller 72 to begin its internal programming at the start of the program, as indicated by the initialization step 170 in FIG. 4. After the program begins, the microcontroller 72 outputs a signal at pin 18 which causes the yellow LED 156 to flash to indicate the microcontroller 72 is activated, as shown at step 172.

Once the microcontroller 72 is activated, the power supply circuit 42 generates a series of voltages, as previously discussed. The line DC voltage 50 is applied through the reference detector 74 to pin 2 of the microcontroller 72. The voltage at pin 2 of microcontroller 72 is compared to the reference voltage applied to pin 1 as shown in step 174. Once the AC line output 48 reaches the required value, 20 volts in the preferred embodiment, the microcontroller 72 enables the solenoid 18 in step 176 by outputting a signal at pin 9 which is connected to the solenoid enable line 102. Next, the microcontroller 72 activates the solenoid 18 by supplying a signal to solenoid pull-in terminal 108. This signal at terminal 108 causes the solenoid to be pulled in, which allows the dropout gear assembly 34 to engage the gear train 28, thereby allowing the motor 16 to move the valve plug member.

After pulling in the solenoid 18 to permit engagement between the gear train 28 and the motor 16, the microcontroller 72 performs a self-calibration function. To self-calibrate, the microcontroller 72 first operates bi-directional motor 16 in the valve open direction for a brief period of time as indicated by step 178 in FIG. 4. As previously indicated, when the motor 16 is operated in the valve open direction, green LED 154 is activated and yellow LED 156 flashes. Next, the motor 16 is operated in the valve closed direction and the microcontroller monitors the operation of photosensor 42, as shown in step 180. The microcontroller 72 then sends out a signal at pin 11 to completely close the valve 10 by operating the motor 16 in a motor closed direction, as indicated by step 182. Once the valve 10 is completely closed, the microcontroller 72 sets the position count to 0.

When the valve 10 has been completely closed, the microcontroller 72 sends out a signal to pin 10 which directs the motor 16 to operate in a valve open direction until the motor 16 has completely opened the valve 10 as indicated by step 184. During the operation of the valve 10 from the completely closed to the completely open position, the microcontroller 72 counts the number of revolutions of motor clutch 36 through the photosensor 42, in the manner previously discussed. By counting the number of revolutions of motor clutch 36, the microcontroller 72 is able to determine the number of revolutions of the motor clutch 36 required for a full valve stroke between the completely closed and the completely open position. Through self-calibration, the microcontroller 72 is able to determine the valve span of the valve 10 without the need for a factory pre-set.

Additionally, as the microcontroller 72 self calibrates and counts the number of motor revolutions between the valve 10 being completely closed and completely open, the microcontroller 72 can compare this count to a stored acceptable range which is preset in the microcontroller. For example, the allowable number of motor revolutions for full valve stroke for the valve shown in the preferred embodiment is between 450–700. If the actual number of revolutions needed for full valve stoke falls outside of this range, the microcontroller 72 will turn on yellow LED 156 to indicate a general valve failure. If during initial self-calibration the microcontroller 72 sends out a valve open signal at pin 10 but does not detect any motor rotation through the photosensor 42, the microcontroller 72 will also turn on all three LEDs to indicate a motor or circuit failure.

After the microcontroller 72 has self-calibrated, the microcontroller 72 checks to determine the type of input from the input selection jumper 94. First, the microcontroller 72 checks to see if the open or closed jumpers are on, as indicated by pins 10 and 12 of the jumper 94. If either of the pins 10 or 12 are on, the valve 10 should be moved to the completely opened or closed position as indicated by the jumper. If neither of the opened and closed jumpers are on, the microcontroller checks the input range selection as indicated by pins 2, 4, 6, and 8 of jumper 94 which are input into pin 17 of the microcontroller 72. If the input range of jumper 94 indicates that the input will be a current value, the microcontroller 72 internally selects the input to be at pin 4 of the microcontroller 72. Otherwise, the input will be a voltage, such that it will be received at pin 3 of the microcontroller 72.

Once the initial range is set, the microcontroller 72 measures the setpoint input at either pin 3 or 4 depending upon the input range selected by jumper 94, as indicated by step 186 in FIG. 4. Specifically, the microcontroller 72 measures the setpoint a number of times and averages the measurement to determine the desired position of the valve 10. After measuring the setpoint input, the microcontroller 72 checks the input from jumper 96 as applied to pin 16 of the microcontroller 72. If the input from jumper 96 indicates the valve should be direct acting, the minimum setpoint input will correspond to a completely closed valve, whereas a maximum input corresponds to a completely open valve. Likewise, if the reverse acting jumper is activated, the microcontroller 72 will interpret a low input to be a completely open valve, whereas a high input will be a completely closed valve.

Microcontroller 72 compares the desired set point to the current position of the valve 10 and calculates an error value at step 188. Immediately following self-calibration, the valve 10 will be in the completely open position. Based on the difference between the desired setpoint and the valve plug position, the microcontroller 72 either directs the motor 16 to open or close the valve 10 as shown at step 190. As the valve 10 opens or closes, the microcontroller 72 counts the number of rotations of motor clutch 36 through the photosensor 42 until the position of the valve 10 corresponds to the desired setpoint. During normal operation of the valve control circuit 44, the microcontroller 72 will continue to update the current valve position, monitor the input at either pin 3 or 4 and operate the motor 16 in either a valve closed or a valve open direction, dependent upon the difference between the setpoint and the current position of the valve 10 as shown in step 192.

During operation of the modulating valve 10, the microcontroller 72 will reset its zero position every time the valve 10 is required to completely close, thereby continuously adjusting the valve accuracy. In a preferred embodiment of the invention, the microcontroller 72 can be programmed to reset its zero position at a set time interval. For instance, should the valve 10 continue to operate without completely closing, the microcontroller 72 will rezero the valve approximately every 10 days. Additionally, the microcontroller 72 is programmed to self-reset and recalibrate the rotational count required for the valve 10 to go between the completely open and completely closed position if the completely open position count of valve 10 decreases by more than 5% from the value determined during initial calibration.

Should power be lost to the microcontroller 72, which also indicates that power has been lost to the modulating valve 10, the microcontroller 72 will output a signal at pin

8, after a time delay of about 3 seconds, which is connected to the solenoid release line 118. A high voltage at line 118 releases the solenoid 18, which causes the drop out gear assembly 30 to be disengaged from the gear train 28. Therefore, upon power loss, the return spring included in the modulating valve 10 can return the valve 10 to either a completely open or a completely closed position.

Through the use of the valve control circuit 44, shown in FIG. 3, the modulating valve 10 does not need to be calibrated at the factory, thereby reducing the need for specific tolerances of the potentiometer which was necessary in prior control circuits. Additionally, the valve control circuit 44 has a self-calibrating function, such that the microcontroller 72 recalibrates itself periodically during normal usage. This selfcalibration during normal usage can compensate for a variety of causes of degradation in the system, such as in the light emitting diode 146 or for a build-up of dirt film on the reflective strip 38 contained on the motor clutch 36. Additionally, the microcontroller 72 provides the required timing and signals to operate a solenoid clutch, thereby reducing the circuitry needed to perform such a function. Likewise, the microcontroller 72 is able to receive a variety of input signals such as a 0 to 10 volt input or a 4 to 20 mA input, thereby allowing the modulating valve 10 to be used with a variety of thermostats or similar devices.

As previously discussed, the three LEDs 152, 154 and 156 can be operated by the microcontroller 72 to externally indicate the status of the valve 10. In the preferred embodiment of the invention, the status of valve 10 is indicated as follows. When the valve is closing, the red LED 152 is turned on continuously. When the valve 10 is opening, the green LED 154 is turned on continuously. During the valve calibrating and zeroing functions, as shown in steps 172, 174 176, 180 and 182, the red and green LEDs 152 and 154 are on as appropriate based on the motor 16 operation, and the yellow LED 156 is flashing. When the valve stroke falls outside the preset range, the microcontroller 72 turns on the yellow LED 156 as indicated in step 194 of FIG. 4. If no motion is detected when attempting to open the valve during calibration, the red, green and yellow LEDs are on continuously.

It is understood that the part numbers described are for illustrative purposes only and may be replaced by other comparable parts. It is also recognized that other equivalents, alternatives, or modifications aside from those expressly stated, are possible and within the scope of the pending claims.

I claim:

1. A control unit for controlling the flow of fluid through a modulating valve, the modulating valve having a valve plug operable between a completely open and a completely closed position, the control unit comprising:
   a bi-directional motor connected to the valve plug through a motor clutch and a series of gears to move the valve plug between the completely open and closed positions;
   a microcontroller connected to the motor to selectively control the motor to adjust the position of the valve plug;
   an optical sensor interconnected with the microcontroller, the optical sensor monitoring the rotation of the motor clutch for providing input signals to the microcontroller; and
   a setpoint signal selector in communication with the microcontroller, the setpoint signal selector being operable to set upper and lower limits for a setpoint input signal, wherein the microcontroller receives the setpoint input signal from an external temperature controller and operates the motor to correctly position the valve plug based on the value of the setpoint input signal with respect to the upper and lower limits set by the setpoint signal selector.

2. The control unit of claim 1 wherein the optical sensor includes a light emitting diode, a photoreceptor, and a reflective portion associated with the motor and rotatable in response to operation of the motor, such that the light from the light emitting diode is reflected by the reflective strip and received by the photoreceptor.

3. The control unit of claim 1 further comprising:
   a solenoid clutch assembly positioned between the motor and the valve plug and being operable between an activated and a deactivated state, the motor being able to move the valve plug when the solenoid is in the activated state and being unable to move the valve plug when the solenoid is in the deactivated state; and
   a solenoid control circuit connected between the microcontroller and the solenoid clutch assembly such that the microcontroller can control the operation of a solenoid clutch assembly through the solenoid control circuit.

4. The control unit of claim 1 further comprising a plurality of indicator lights connected to the microcontroller for indicating a variety of valve functions.

5. The control unit of claim 1 further comprising a supply voltage detector in communication with the microcontroller such that the microcontroller can monitor the value of a supplied voltage used to operate the control unit.

6. The control unit of claim 1 wherein the setpoint signal selector is operable to select between voltage-based upper and lower limits and current-based upper and lower limits such that the control unit can be used with an external temperature controller that generates a voltage-based setpoint signal and an external temperature controller that generates a current-based setpoint signal.

7. A method of controlling the position of a valve plug in a modulating valve including a bi-directional motor, the modulating valve including a valve plug operable between a completely open and a completely closed position, the method comprising the steps of:
   initially calibrating the valve by counting the number of revolutions of the bi-directional motor required to move the valve plug between the completely closed to the completely open position;
   storing the number of revolutions in a microcontroller as a valve stroke count;
   assigning a current position count based on the current position of the valve plug between the completely open and the completely closed position;
   inputting an upper and a lower setpoint limit to the microcontroller, the upper and lower reference limits defining a setpoint range;
   supplying a setpoint signal to the microcontroller, the setpoint signal being between the upper and lower setpoint limits;
   determining the ratio of the setpoint signal to the setpoint range;
   comparing the current position count to the ratio of the setpoint signal to the setpoint range to generate a position error;
   operating the bi-directional motor to move the valve plug in a direction based on the position error;

counting the number of revolutions of the bi-directional motor to update the current position count; and stopping the bi-directional motor when the current position count approximately equals the ratio of the setpoint signal to the setpoint range.

8. The method of claim 7 wherein the step of counting the number of revolutions includes positioning a reflective surface on the bi-directional motor and positioning a photo receptor in a fixed location such that the photo receptor counts the number of revolutions of the motor.

9. The method of claim 7 further comprising the steps of:

activating a solenoid clutch assembly positioned between the bi-directional motor and the valve plug to permit the bi-directional electric motor to move the valve plug; and deactivating the clutch assembly to permit a return spring to move the valve plug to either a completely open or completely closed position.

10. The method of claim 7 further comprising the step of receiving a valve direction signal, the valve direction signal indicating the direction of valve movement upon receiving an increasing setpoint signal.

11. The method of claim 7 further comprising the step of operating a plurality of indicator lights to indicate various operating conditions.

12. The method of claim 7 further comprising the step of rezeroing the valve after a predetermined continuous period of operating time, the step of rezeroing including moving the valve plug to a completely closed position and setting the current position count to zero.

13. The method of claim 7 further comprising the step of comparing the valve stroke count to a predetermined acceptable range, such that if the valve stroke count is outside the predetermined range, the microcontroller will operate an indicator light.

14. The method of claim 7 further comprising the step of comparing the current position count to the maximum valve stroke count when the valve plug is in the completely open position, and recalibrating the modulating valve if the difference between the current position count and the maximum valve stroke count exceeds a predetermined percentage.

15. A modulating valve for controlling the flow of fluid therethrough, the modulating valve having a valve plug operable between a completely open and a completely closed position, the modulating valve comprising:

a bi-directional motor interconnected with the valve plug to move the valve plug between the completely open and closed positions;

a microcontroller connected to the motor to selectively control operation of the motor to control the position of the valve plug;

a sensor positioned to monitor the operation of the motor as the motor moves the valve plug, the sensor being in communication with the microcontroller;

a solenoid clutch assembly positioned between the motor and the valve plug and operable between an activated state and a deactivated state, the motor being able to move the valve plug when the solenoid is in the activated state and being unable to move the valve plug when the solenoid is in the deactivated state; and a solenoid control circuit connected between the microcontroller and the solenoid clutch assembly such that the microcontroller can control the operation of the solenoid clutch assembly through the solenoid control circuit.

16. The modulating valve of claim 15 further comprising a bias spring connected to the valve stem of the modulating valve, the bias spring returning the valve plug to a predetermined position when the solenoid clutch is in the deactivated state.

17. The modulating valve of claim 15 further comprising a plurality of indicator lights connected to the microcontroller for providing a visual indication as to operation of the valve.

18. The modulating valve of claim 15 further comprising an input selector in communication with the microcontroller, the input selector having a plurality of input ranges each being selectively coupled to the microcontroller.

19. The modulating valve of claim 16 further comprising an input selector in communication with the microcontroller, the input selector having a plurality of input ranges each being selectively coupled to the microcontroller.

20. A modulating valve for controlling the flow of fluid therethrough, the modulating valve having a valve plug operable between a completely open and a completely closed position, the modulating valve comprising:

a bi-directional motor interconnected with the valve plug to move the valve plug between the completely open and closed positions;

a microcontroller connected to the motor to selectively control operation of the motor to control the position of the valve plug;

a sensor positioned to monitor the operation of the motor as the motor moves the valve plug, the sensor being in communication with the microcontroller; and a plurality of indicator lights connected to the microcontroller for providing a visual indication as to operation of the valve, wherein the indicator lights include a first indicator light signaling forward motor operation, a second indicator light indicating reverse motor operation, and a third indicator light indicating calibration status.

21. A control unit for controlling the flow of fluid through a modulating valve, the modulating valve having a valve plug operable between a completely open and a completely closed position, the control unit comprising:

a bi-directional motor connected to the valve plug through a motor clutch and a series of gears to move the valve plug between the completely open and closed positions;

a microcontroller connected to the motor to selectively control the motor to adjust the position of the valve plug;

an optical sensor interconnected with the microcontroller, the optical sensor monitoring the rotation of the motor clutch for providing input signals to the microcontroller, wherein the optical sensor includes a light emitting diode, a photoreceptor, and a reflective portion associated with the motor and rotatable in response to operation of the motor, such that the light from the light emitting diode is reflected by the reflective portion and received by the photoreceptor; and a setpoint signal selector in communication with the microcontroller, the setpoint signal selector selectively setting upper and lower limits of a setpoint input signal such that the microcontroller operates the motor based on the value of the setpoint input signal with respect to the upper and lower limits set by the setpoint signal selector.

22. The control unit of claim 21 further comprising a plurality of indicator lights connected to the microcontroller for indicating a variety of valve functions.

23. The control unit for controlling the flow of fluid through a modulating valve, the modulating valve having a valve plug operable between a completely open and a completely closed position, the control unit comprising:

a bi-directional motor connected to the valve plug through a motor clutch and a series of gears to move the valve plug between the completely open and closed positions;

a microcontroller connected to the motor to selectively control the motor to adjust the position of the valve plug;

an optical sensor interconnected with the microcontroller, the optical sensor monitoring the rotation of the motor clutch for providing input signals to the microcontroller;

a setpoint signal selector in communication with the microcontroller, the setpoint signal selector selectively setting upper and lower limits of a setpoint input signal such that the microcontroller operates the motor based on the value of the setpoint input signal with respect to the upper and lower limits set by the setpoint signal selector;

a solenoid clutch assembly positioned between the motor and the valve plug and being operable between an activated and a deactivated state, the motor being able to move the valve plug when the solenoid is in the activated state and being unable to move the valve plug when the solenoid is in the deactivated state; and a solenoid control circuit connected between the microcontroller and the solenoid clutch assembly such that the microcontroller can control the operation of a solenoid clutch assembly through the solenoid control circuit.

24. The control unit of claim 23 further comprising a plurality of indicator lights connected to the microcontroller for indicating a variety of valve functions.

25. A control unit for controlling the flow of fluid through a modulating valve, the modulating valve having a valve plug operable between a completely open and a completely closed position, the control unit comprising:

a bi-directional motor connected to the valve plug through a motor clutch and a series of gears to move the valve plug between the completely open and closed positions;

a microcontroller connected to the motor to selectively control the motor to adjust the position of the valve plug;

an optical sensor interconnected with the microcontroller, the optical sensor monitoring the rotation of the motor clutch for providing input signals to the microcontroller;

a setpoint signal selector in communication with the microcontroller, the setpoint signal selector selectively setting upper and lower limits of a setpoint input signal such that the microcontroller operates the motor based on the value of the setpoint input signal with respect to the upper and lower limits set by the setpoint signal selector; and a supply voltage detector in communication with the microcontroller such that the microcontroller can monitor the value of a supplied voltage used to operate the control unit.

26. A method of controlling the position of a valve plug in a modulating valve including a bi-directional motor, the modulating valve including a valve plug operable between a completely open and a completely closed position in response to operation of the motor, the method comprising the steps of:

interconnecting a microcontroller with the motor for controlling operation of the motor;

providing inputs to the microcontroller indicative of operation of the motor;

calibrating the valve by counting the number of revolutions of the motor required to move the valve plug from a completely open to a completely closed position;

storing the number of revolutions in the microcontroller as a valve stroke count;

assigning a current position count based on the position of the valve plug between the completely open and completely closed position;

supplying a setpoint signal to the microcontroller;

comparing the current position count to the setpoint signal to generate a position error;

operating the motor to move the valve plug based on the position error;

counting the number of revolutions of the motor to update the current position count; and stopping the motor when the current position count approximately equals the setpoint signal.

27. The method of claim 26 wherein the step of counting the number of revolutions includes positioning a reflective surface on the motor and positioning a photo receptor in a fixed location such that the photo receptor counts the number of revolutions of the motor.

28. The method of claim 26 further comprising the steps of:

activating a solenoid clutch assembly positioned between the motor and the valve plug to permit the motor to move the valve plug; and deactivating the clutch assembly to permit a return spring to move the valve plug to either the completely open or completely closed position.

29. The method of claim 26 further comprising the step of receiving a valve direction signal, the valve direction signal indicating the direction of valve movement upon receiving an increasing setpoint signal.

30. The method of claim 26 further comprising the step of operating a plurality of indicator lights to indicate various operating conditions.

31. The method of claim 26 further comprising the step of rezeroing the valve after a predetermined continuous period of operating time, the step of rezeroing including moving the valve plug to a complete closed position and setting the current position count to zero.

32. The method of claim 26 further comprising the step of comparing the valve stroke count to a predetermined acceptable range, such that if the valve stroke count is outside the predetermined range, the microcontroller will operate an indicator light.

33. The method of claim 26 further comprising the steps of:

inputting an upper and lower setpoint limit to the microcontroller, the upper and lower setpoint limit defining a setpoint range; and determining the ratio of the setpoint signal to the reference range, such that the ratio of the setpoint signal to the setpoint range is compared to the ratio of the current position count to the valve stroke count to generate the position error.

34. The method of claim 26 further comprising the step of comparing the current position count to the maximum valve stroke count when the valve plug is in the completely open position, and recalibrating the modulating valve if the difference between the current position count and the maximum valve stroke count exceeds a predetermined percentage.

35. The method of claim 34 wherein the predetermined percentage difference is approximately 5%.

* * * * *